United States Patent [19]
Schelling et al.

[11] Patent Number: 5,907,721
[45] Date of Patent: May 25, 1999

[54] PROTECTIVE HOUSING FOR CAMERA

[75] Inventors: Anna Schelling, Geneva; David R. Dowe, Holley, both of N.Y.

[73] Assignee: Eastman Kodak Company, Rochester, N.Y.

[21] Appl. No.: 09/073,449

[22] Filed: May 5, 1998

[51] Int. Cl.$^6$ .................................................. G03B 17/08
[52] U.S. Cl. .......................................... 396/27; 206/316.2
[58] Field of Search ........................ 396/25–29; 348/81; 206/316.2, 811

[56]  References Cited

U.S. PATENT DOCUMENTS

| | | |
|---|---|---|
| D. 334,397 | 3/1993 | Kohno et al. . |
| 3,036,506 | 5/1962 | Andresen . |
| 4,797,697 | 1/1989 | Heuer et al. . |
| 5,115,265 | 5/1992 | Swayze . |
| 5,239,324 | 8/1993 | Ohmura et al. . |
| 5,325,139 | 6/1994 | Matsumoto . |
| 5,610,655 | 3/1997 | Wakabayashi et al. . |

*Primary Examiner*—Howard B. Blankenship
*Attorney, Agent, or Firm*—Roger A. Fields

[57] ABSTRACT

A protective housing for a camera comprising a pouch adapted to contain the camera, is characterized in that the pouch has at least one pivotable portion that can be pivoted about a pivot axis to open the pouch in order to allow the camera to be inserted into the pouch, and a manually depressible actuating button is supported on the pouch at the pivot axis to be able to be depressed along the pivot axis to similarly depress a shutter release button of the camera in order to initiate picture-taking.

6 Claims, 5 Drawing Sheets

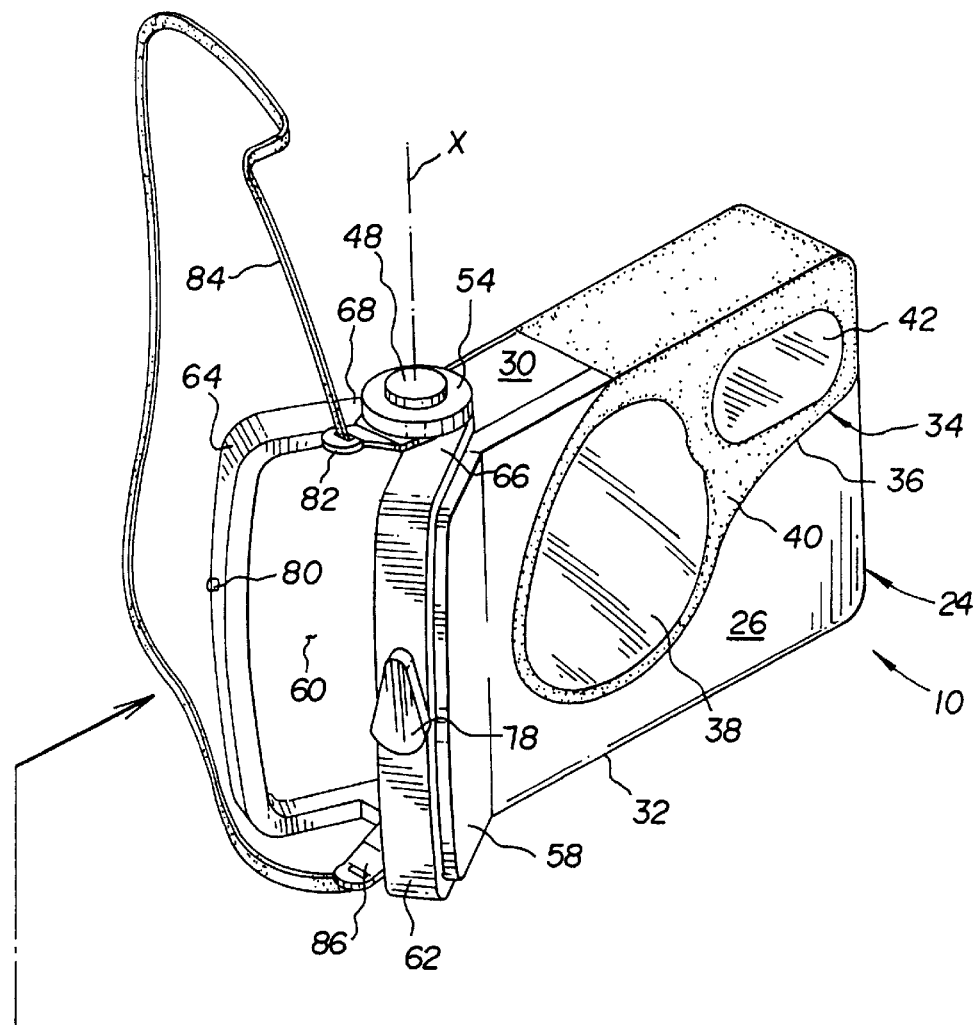
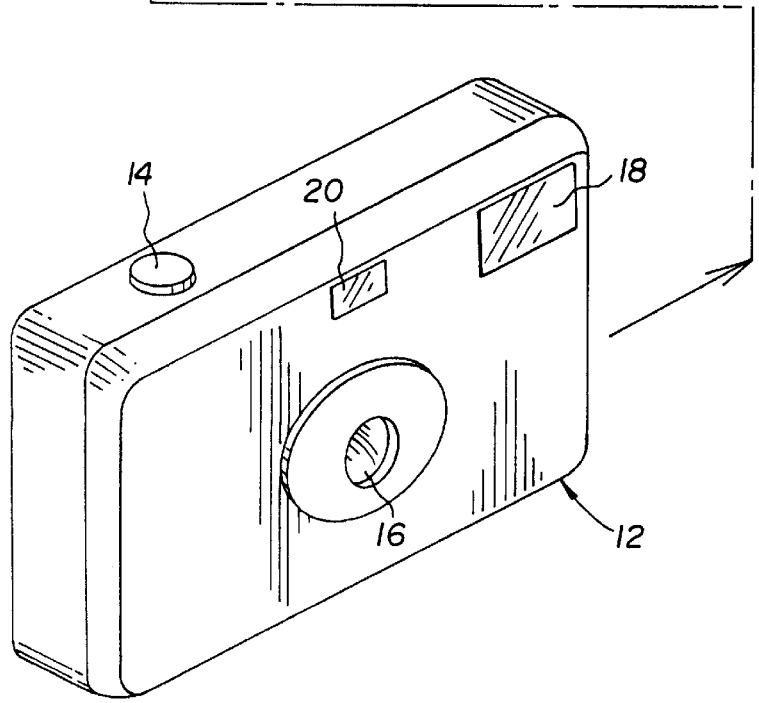
FIG. 1

PROTECTIVE HOUSING FOR CAMERA

FIELD OF THE INVENTION

The invention relates generally to the field of photography, and in particular to a protective housing for a camera that preferably is waterproof and shock absorbing.

BACKGROUND OF THE INVENTION

It is known for a waterproof housing to be in the form of a generally rectangular collapsible bag or pouch made from a flexible waterproof material and which is shaped and dimensioned to enclose a camera. The flexible waterproof material has sufficient flexibility to allow the camera to be operated through the material when the camera is enclosed in the pouch. See prior art U.S. Pat. No. 3,036,506 issued May 29, 1962.

PROBLEM

The flexible collapsible nature of the pouch can make it difficult to firmly depress a shutter release button of the camera in order to initiate picture-taking. One's finger can slip from the area of the pouch over the shutter release button before the shutter release button is sufficiently depressed. This problem is more acute when the pouch is used underwater.

SUMMARY OF THE INVENTION

A protective housing for a camera comprising a pouch adapted to contain the camera, is characterized in that:

the pouch has at least one pivotable portion that can be pivoted about a pivot axis to open the pouch in order to allow the camera to be inserted into the pouch; and a manually depressible actuating button is supported on the pouch at the pivot axis to be able to be depressed along the pivot axis to similarly depress a shutter release button of the camera in order to initiate picture-taking.

BRIEF DESCRIPTION OF THE DRAWINGS

FIG. 1 is a front perspective view of a protective housing for a camera according to a preferred embodiment of the invention, showing the protective housing opened and the camera outside the protective housing;

DETAILED DESCRIPTION OF THE INVENTION

Figure 2:
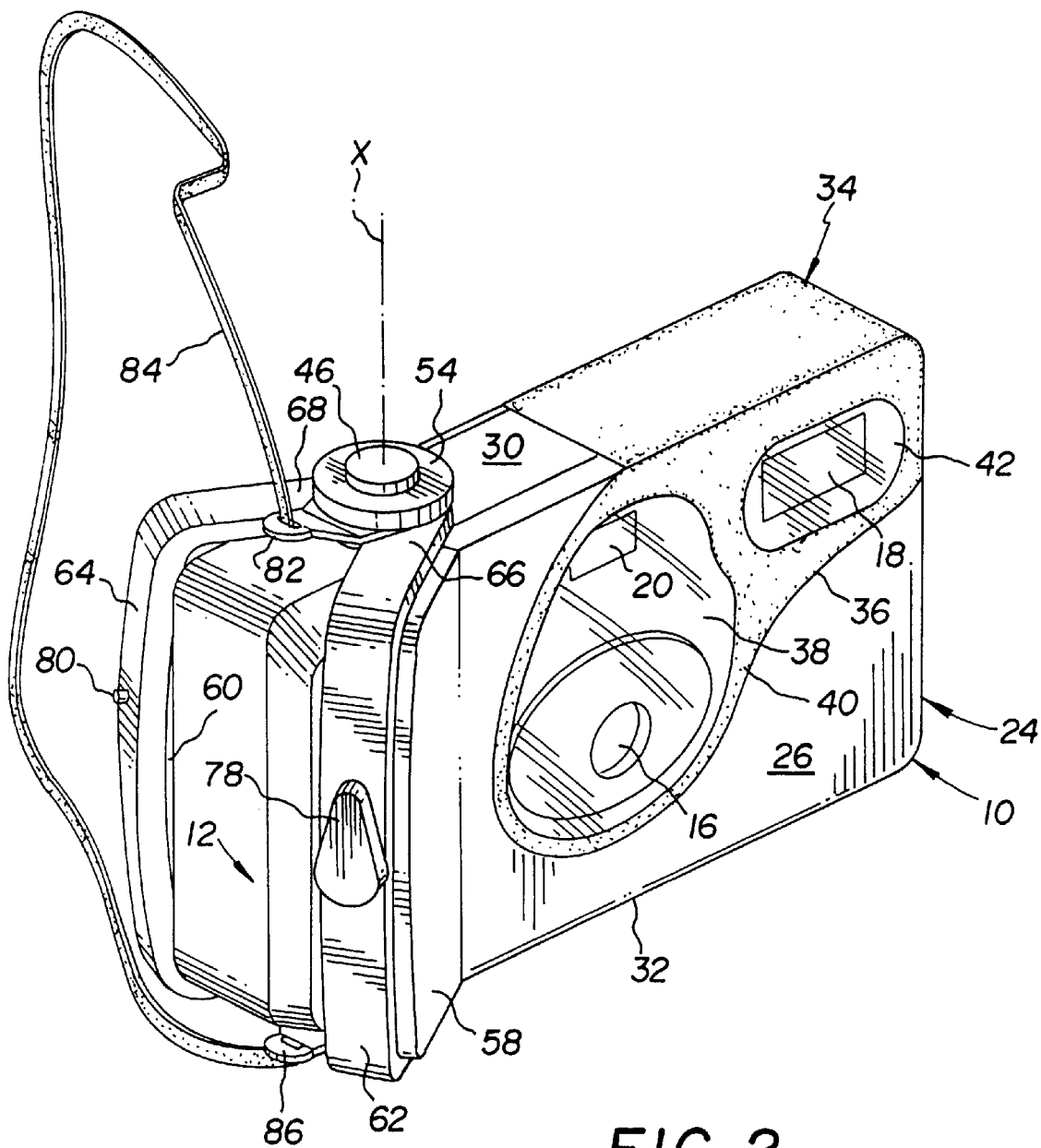
FIG. 2 is a front perspective view similar to FIG. 1, showing the protective housing opened and the camera inside the protective housing.

The invention is disclosed as being embodied preferably in a waterproof, shock absorbing protective housing for a camera. Because the features of a protective housing for a camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–4 show a protective housing 10 for a camera 12.

The camera 12 is a known type that includes a manually depressible shutter release button 14, a taking lens 16, a flash emission lens 18, and a pair of optically aligned front and rear viewfinder lenses 20 and 22. See FIGS. 1 and 4.

A rectangular-shaped pouch or bag 24 of the protective housing 10 has front and rear faces 26, 28 and top and bottom faces 30, 32. The pouch 24 is constructed of rubber or plastic flexible, resilient, waterproof, shock absorbing material. See FIGS. 3 and 4.

Figure 3:
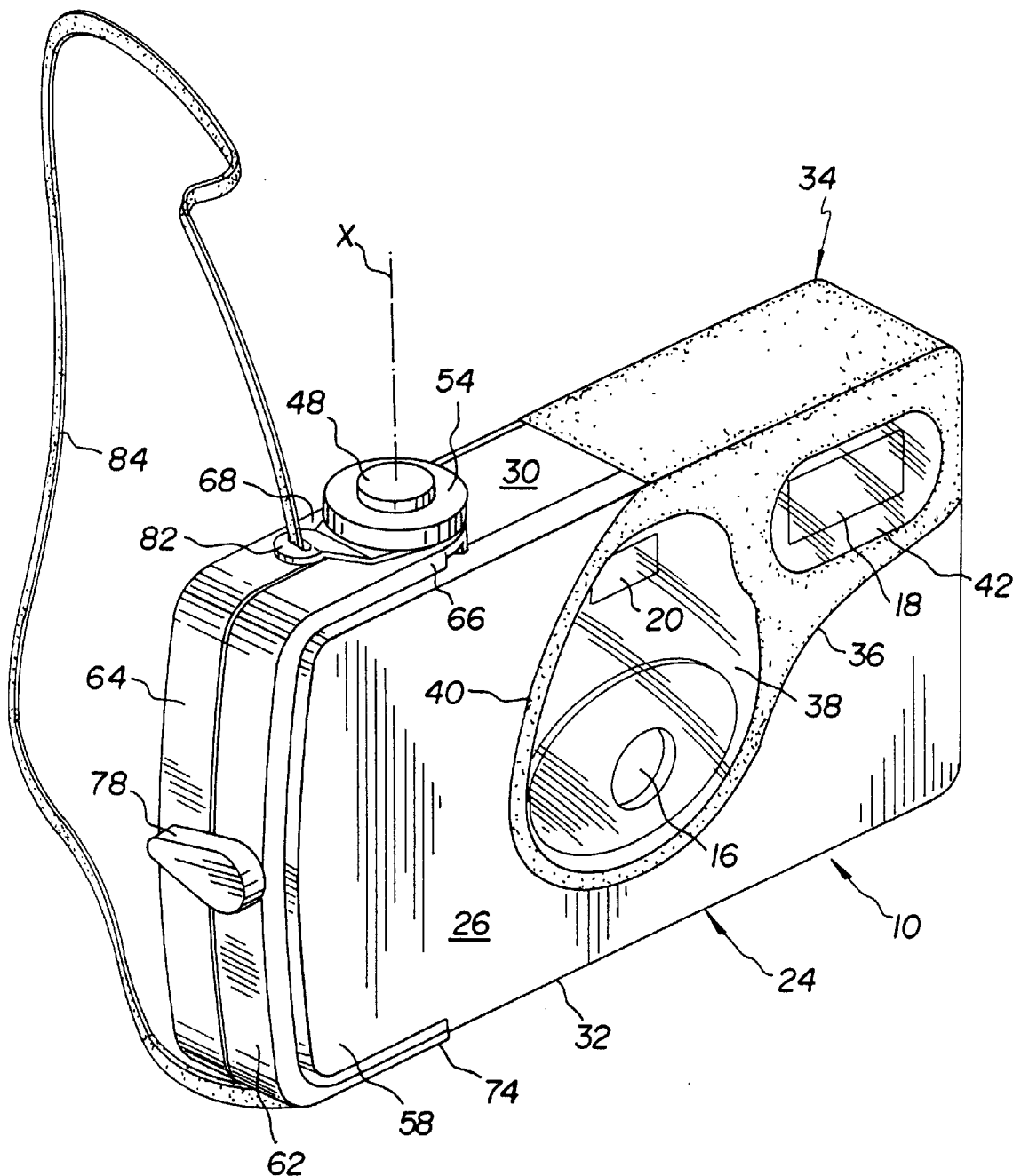
FIG. 3 is a front perspective view similar to FIG. 1, showing the protective housing closed with the camera inside the protective housing.
Figure 4:
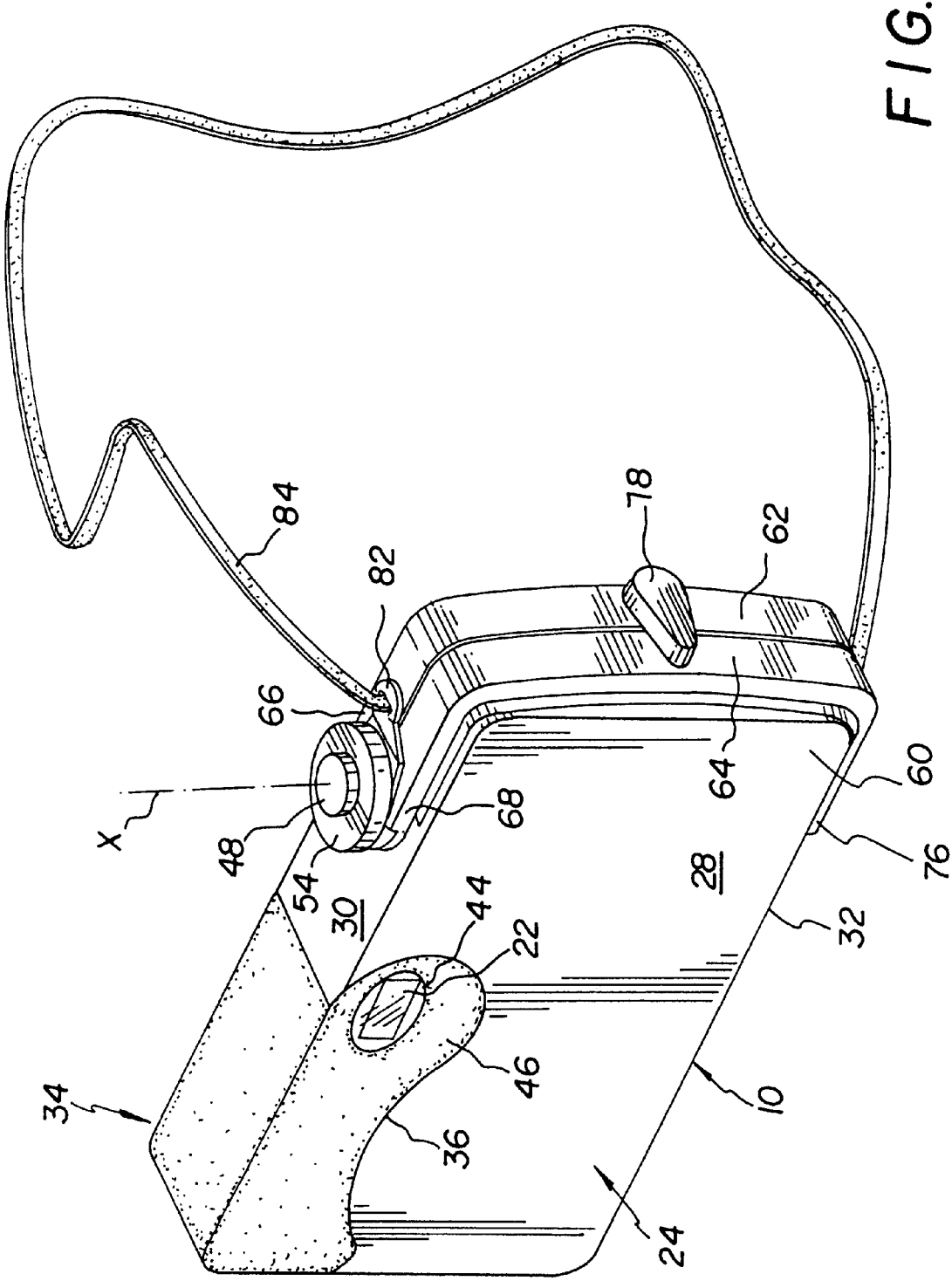
FIG. 4 is a rear perspective view similar to FIG. 1, showing the protective housing closed with the camera inside the protective housing.

A window-support insert 34 is constructed of rubber or plastic flexible, resilient, waterproof, shock absorbing material which is less flexible than the particular material the pouch 24 is constructed of. The window-support insert 34 fills a cut-out (not shown) in the front, top and rear faces 26, 30 and 28 of the pouch 24, and partially overlaps the pouch at a continuous perimeter 36 of the window-support insert. A known-type continuous water-tight seal (not shown) is provided between the continuous perimeter 36 and the pouch 34 to prevent water leakage into the cut-out. As shown in FIGS. 2 and 3, a relatively large, rigid, front transparent plastic or glass window 38 is arranged in an opening (not indicated) in a front face 40 of the window-support insert 34, in front of the taking lens 16 and the front viewfinder lens 20 of the camera 12, and a smaller, rigid, front transparent plastic or glass window 42 is arranged in another opening (not indicated) in the front face 40 of the window-support piece 34, in front of the flash emission lens 18 of the camera 12. As shown in FIG. 4, a smaller, rigid, rear transparent plastic or glass window 44 is arranged in an opening (not indicated) in a rear face 46 of the window-support piece 34, in front of the rear viewfinder lens 22 of the camera 12. Respective known-type continuous water-tight gaskets (not shown) surround the front windows 38 and 42 and the rear window 44 to prevent water leakage into the openings.

Figure 5:
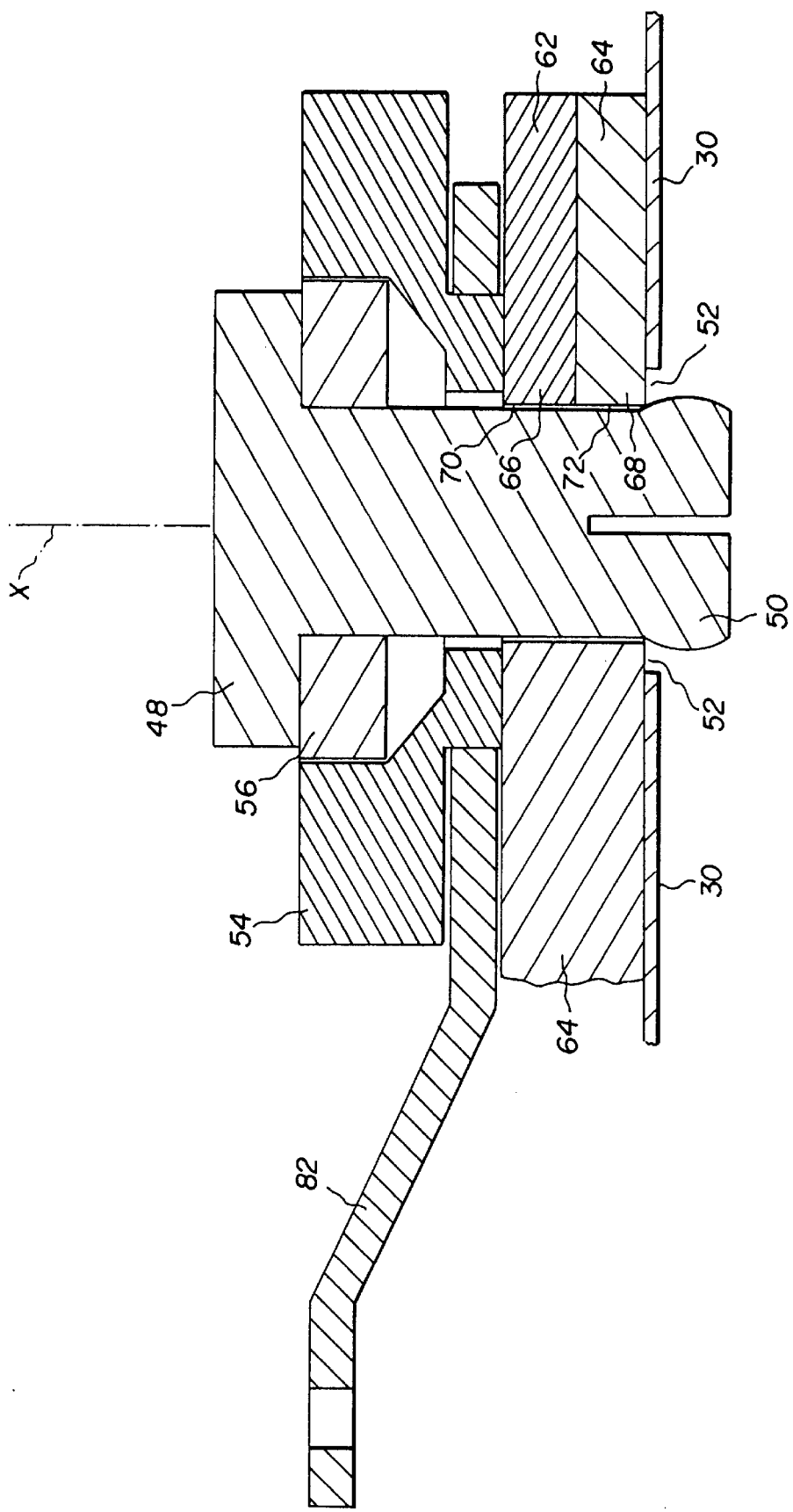
FIG. 5 is a sectional view of an actuating button on the protective housing, which is manually depressed to similarly depress a shutter release button on the camera.

As shown in FIG. 5, an external actuating button 48 has a depending integral plunger 50 that projects through an opening 52 in the top face 30 of the pouch 24. A rigid collar 54 which contains an elastomer sealing ring 56 surrounds the plunger 50. The actuating button 48 is intended to be manually depressed to cause the plunger 50 to similarly depress the shutter release button 14 on the camera 12 in order to initiate picture-taking.

The pouch 24 has an integral pair of similar front and rear pivotable portions 58 and 60 that can be swung away from each other about the plunger 50, as shown in FIGS. 1 and 2, to open the pouch in order to allow the camera 12 to be inserted into the pouch and that can be swung towards each other to close the pouch, as shown in FIGS. 3 and 4. A pivot axis X for the front and rear pivotable portions 58 and 60 is shown in FIGS. 1 and 5. The pivot axis X longitudinally extends through the center of the actuating button 48 and the plunger 50. The front and rear pivotable portions 58 and 60 have respective rigid, u-shaped, edge-defining members 62 and 64. As shown in FIG. 5, respective top ends 66 and 68 of the front and rear pivotable portions 58 and 60 have coaxial openings 70 and 72 through which the plunger 50 extends to commonly support the front and rear pivotable portions to be swung away from one another and towards one another. Likewise, respective bottom ends 74 and 76 of the front and rear pivotable portions 58 and 60 are pivotally connected for the same purpose. See FIGS. 3 and 4. A known-type clasp 78 and pin 80 on the front and rear pivotable portions 58 and 60 mutually engage when the pouch 24 is closed.

A strap retainer 82 for a neck or wrist strap 84 is anchored to the collar 54, as shown in FIGS. 1 and 5. Another strap retainer 86 for the neck or wrist strap 84 is fixed to the bottom face 32 of the pouch.

The invention has been described with reference to a preferred embodiment. However, it will be appreciated that variations and modifications can be effected by a person of ordinary skill in the art without departing from the scope of the invention.

PARTS LIST

- 10. protective housing
- 12. camera
- 14. shutter release button
- 16. taking lens
- 18. flash emission lens
- 20. front viewfinder lens
- 22. rear viewfinder lens
- 24. pouch
- 26. front face
- 28. rear face
- 30. top face
- 32. bottom face
- 34. window-support insert
- 36. continuous perimeter
- 38. front window
- 40. front face
- 42. front window
- 44. rear window
- 46. rear face
- 48. actuating button
- 50. plunger
- 52. opening
- 54. collar
- 56. sealing ring
- 58. front pivotable portion
- 60. rear pivotable portion
- X. axis
- 62. edge-defining member
- 64. edge-defining member
- 66. top end
- 68. top end
- 70. coaxial opening
- 72. coaxial opening
- 74. bottom end
- 76. bottom end
- 78. clasp
- 80. pin
- 82. strap retainer
- 84. neck or wrist strap
- 86. strap retainer

What is claimed is:

1. A protective housing for a camera comprising a pouch adapted to contain the camera, is characterized in that:

said pouch has at least one pivotable portion that can be pivoted about a pivot axis to open the pouch in order to allow the camera to be inserted into the pouch; and a manually depressible actuating button is supported on said pouch at the pivot axis to be able to be depressed along the pivot axis to similarly depress a shutter release button of the camera in order to initiate picture-taking.

2. A protective housing as recited in claim 1, wherein said pivotable portion is flexible to permit it to be pivoted about the pivot axis and has a rigid edge-defining member with opposite ends adjacent the pivot axis to permit said rigid edge-defining member to be pivoted about the pivot axis in order to pivot the pivotable portion.

3. A protective housing as recited in claim 1, wherein a strap retainer for a neck or wrist strap has one end proximate said actuating button.

4. A protective housing for a camera comprising a pouch adapted to contain the camera, is characterized in that:

said pouch is flexible and has an integral pair of similar pivotable portions that can be swung away from one another about a pivot axis to open the pouch in order to allow the camera to be inserted into the pouch; and a manually depressible actuating button is supported on said pouch at the pivot axis to be able to be depressed along the pivot axis to similarly depress a shutter release button of the camera in order to initiate picture-taking.

5. A protective housing as recited in claim 4, wherein said pivotable portions have respective rigid edge-defining members with opposite ends adjacent the pivot axis to permit said rigid edge-defining members to be pivoted away from one another about the pivot axis in order to swing the pivotable portions away from one another.

6. A protective housing as recited in claim 5, wherein said edge-defining members have mutually engaging elements that engage to hold the edge-defining members together.

* * * * *